(12) United States Patent
Iqbal et al.

(10) Patent No.: US 11,935,303 B2
(45) Date of Patent: Mar. 19, 2024

(54) SYSTEM AND METHOD FOR MITIGATING CROWD PANIC DETECTION

(71) Applicant: Patriot One Technologies Inc., Toronto (CA)

(72) Inventors: Junaid Iqbal, Fredericton (CA); James Allan Douglas Cameron, Fredericton (CA); Phil Konrad Munz, Saint John (CA)

(73) Assignee: Patriot One Technologies Inc.

( * ) Notice: Subject to any disclaimer, the term of this patent is extended or adjusted under 35 U.S.C. 154(b) by 0 days.

(21) Appl. No.: 17/651,440

(22) Filed: Feb. 17, 2022

(65) Prior Publication Data

US 2022/0262121 A1   Aug. 18, 2022

Related U.S. Application Data

(60) Provisional application No. 63/150,268, filed on Feb. 17, 2021.

(51) Int. Cl.
| | |
|---|---|
| *G06V 40/10* | (2022.01) |
| *G06V 20/40* | (2022.01) |
| *G06V 20/52* | (2022.01) |
| *G06V 40/20* | (2022.01) |
| *H04N 7/18* | (2006.01) |

(52) U.S. Cl.
CPC .............. *G06V 20/53* (2022.01); *G06V 20/41* (2022.01); *G06V 40/103* (2022.01); *G06V 40/20* (2022.01); *H04N 7/183* (2013.01)

(58) Field of Classification Search
CPC ...... G06V 20/53; G06V 20/41; G06V 40/103; G06V 40/20; H04N 7/183
See application file for complete search history.

(56) References Cited

U.S. PATENT DOCUMENTS

2016/0019427 A1* 1/2016 Martin ................... G06V 40/10
   382/103
2022/0150414 A1* 5/2022 Almehmadi ........... H04N 5/247

* cited by examiner

*Primary Examiner* — Daniel T Tekle

(57) ABSTRACT

A threat detection system and method for detecting panic detection in a crowd of people. The threat detection system using software algorithms detect people's movement from video camera scene and video feeds. The system analyses the recent history of the scene to describe features that would be considered common/normal in the scene when enough people are present. The system then uses that baseline information to continually analyze frames with the requisite number of people in a frame and update the baseline features. If the features of the scene change dramatically based on the perceived movement of the people in the scene and meet or exceed the threshold features for movement in enough consecutive frames, then the systems determines that there is panic in the scene.

17 Claims, 10 Drawing Sheets

PATSCAN Security Assist

- Notify security personnel of emerging threats within their environment
- Augment situational awareness by adding in addition sensors to be monitored
- Stretch: Support identification and re-identification of a threat and track through the environment

SYSTEM AND METHOD FOR MITIGATING CROWD PANIC DETECTION

CROSS REFERENCE TO RELATED APPLICATIONS

The application claims priority to and the benefit of U.S. Provisional Patent Application Ser. No. 63/150,268, entitled "SYSTEM AND METHOD FOR MITIGATING CROWD PANIC DETECTION", filed on Feb. 17, 2021, the disclosure of which is incorporated herein by reference in its entirety.

BACKGROUND

The embodiments described herein relate to security and surveillance, in particular technologies related to video recognition threat detection.

Security screening or threat detection systems may include video management systems (VMS) using hardware (i.e., cameras, mobile phones, computers) and software (i.e., analytics software, artificial intelligence) that are installed in offices, airports and buildings to screen for potential threats (i.e., knives, guns, weapons, etc.). One concern is how analytic software can be used to detect when a group or crowd's movement is anomalous (different from normal) and erratic, allowing security teams to look at when crowds appear "panicked".

There is a desire to implement a system and method for panic detection.

SUMMARY

A threat detection system and method for detecting panic detection in a crowd of people. The threat detection system uses software algorithms to detect people's movement from video camera scene and video feeds. The system analyses the recent history of the scene to describe features that would be considered common/normal in the scene when enough people are present. The system then uses that baseline information to continually analyze frames with the requisite number of people in a frame and update the baseline features. If the features of the scene change dramatically based on the perceived movement of the people in the scene and meet or exceed the threshold features for movement in enough consecutive frames, then the system determines that there is panic in the scene.

DETAILED DESCRIPTION

In a preferred embodiment, a multi-sensor covert threat detection system is disclosed. This covert threat detection system utilizes software, artificial intelligence (AI) and integrated layers of diverse sensor technologies (e.g., cameras, etc.) to deter, detect and defend against active threats (e.g., detection of guns, knives or fights) before these threat events occur.

The threat detection system may allow the system operator to easily determine if the system is operational without requiring testing with actual triggering events. This system may also provide more situational information to the operator in real time as the incident is developing, showing them what they need to know, when they need to know it.

Figure 1:
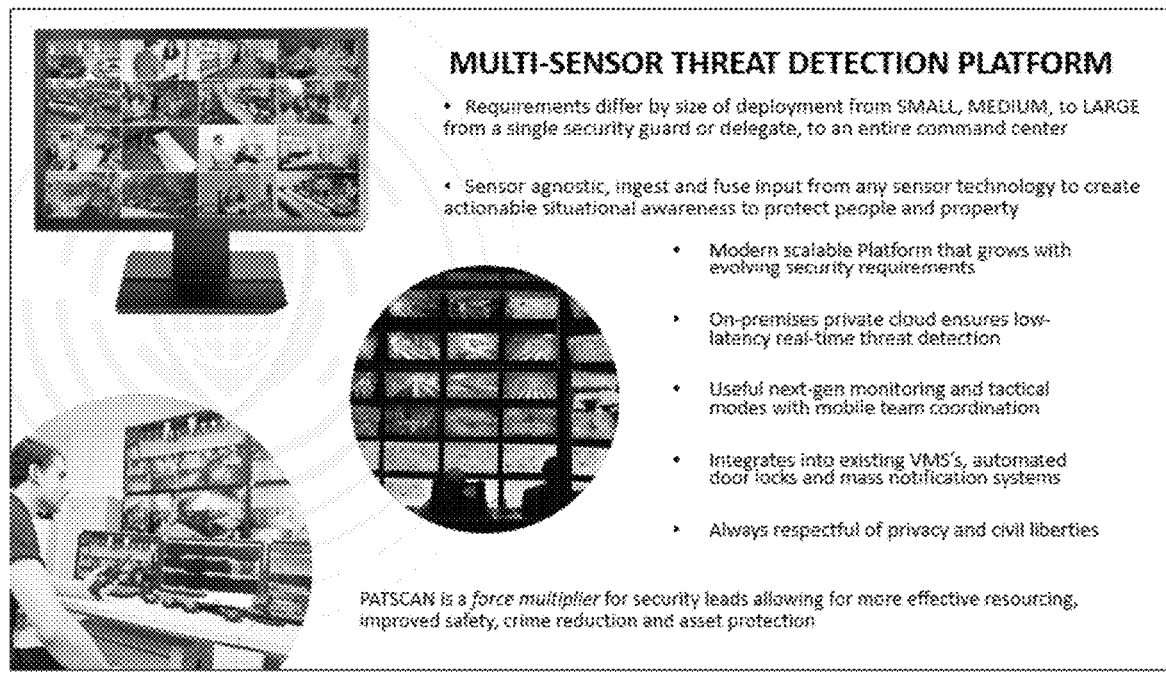
FIG. 1 is a diagram describing the requirements of a multi-sensor threat detection platform.

FIG. 1 is a diagram describing the requirements of a multi-sensor threat detection platform. As seen in FIG. 1, a multi-sensor threat detection platform or system should have the following requirements, including:

- Requirements for different size deployments from small, medium to large from a single security guard or delegate to an entire command center.
- Sensor agnostic and ingest and fuse input from any sensor technology to create actionable situational awareness to protect people and property.
- Modern scalable platform that grows with evolving security requirements.
- On-premises private cloud ensures low-latency real-time threat detection.
- Useful next-gen monitoring and tactical modes with mobile team coordination.
- Integrates into existing video management systems (VMS), automated door locks, and mass notification systems.
- Always respectful of privacy and civil liberties.

Figure 2:
FIG. 2 is a diagram illustrating the Security Assist module.

FIG. 2 is a diagram illustrating the Security Assist module. As seen in FIG. 2, the system also has Security Assist module that:

- Notify security personnel of emerging threats within their environment.
- Augment situational awareness by adding in additional sensors to be monitored.
- Support identification and re-identification of a threat and track through the environment.

Figure 3:
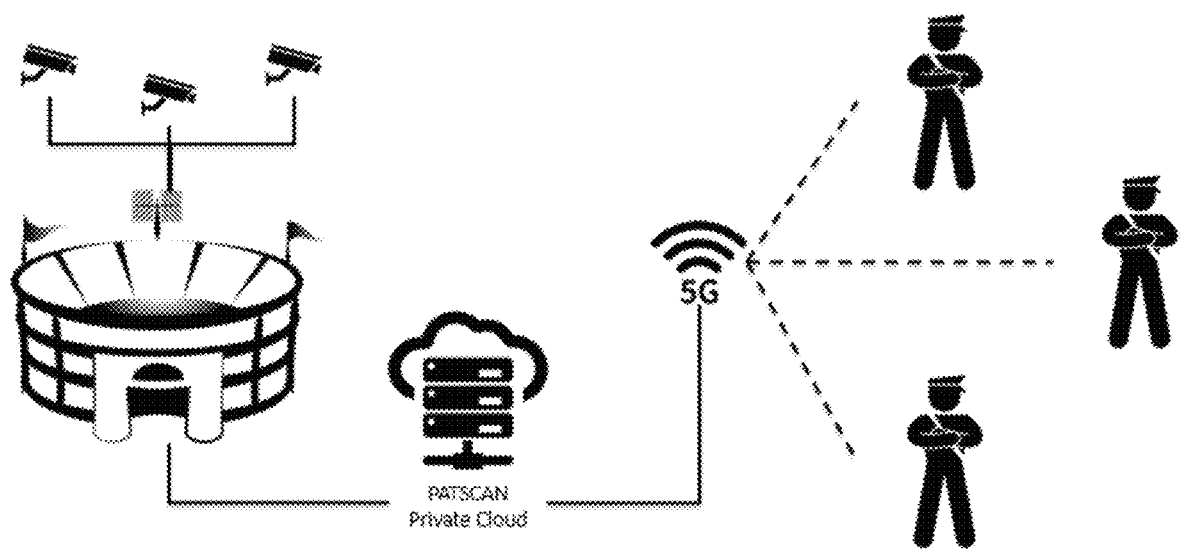
FIG. 3 is a diagram illustrating a private cloud concept.

FIG. 3 is a diagram illustrating a private cloud concept. The system also has a private cloud offering that is:

- Scalable, Private and Secure: On-premise private cloud of threat detection appliance to deliver threat detection at scale. All without the privacy concerns of public cloud infrastructures.
- Self-Managed: No specialized skills required to manage a threat detection cloud cluster. Simply plug in horsepower as needed and the system will do the rest.
- There when you need it: Threat detection system (i.e., PATSCAN Cloud) forms a redundant backend, ensuring that a hardware failure does not leave an organization blind to threats in their environment.
- A sound investment: Threat detection system (i.e., PATSCAN Cloud) grows incrementally to meet customers' needs and changing environments.

Figure 4:
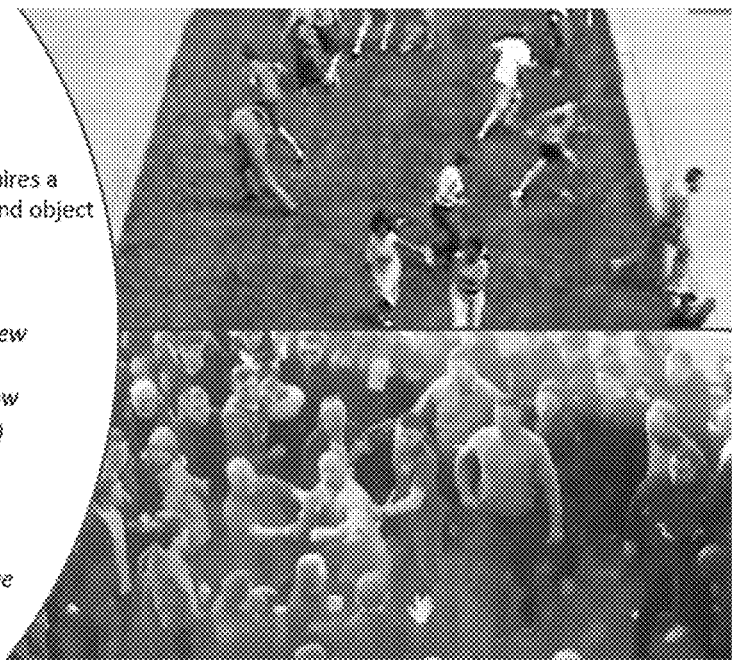
FIG. 4 is a diagram illustrating a Disturbance Detection module.
Figure 5A:
FIGS. 5A to 5E are diagrams illustrating anomalies found in panic detection crowds.
Figure 5B:
Figure 5C:
Figure 5D:
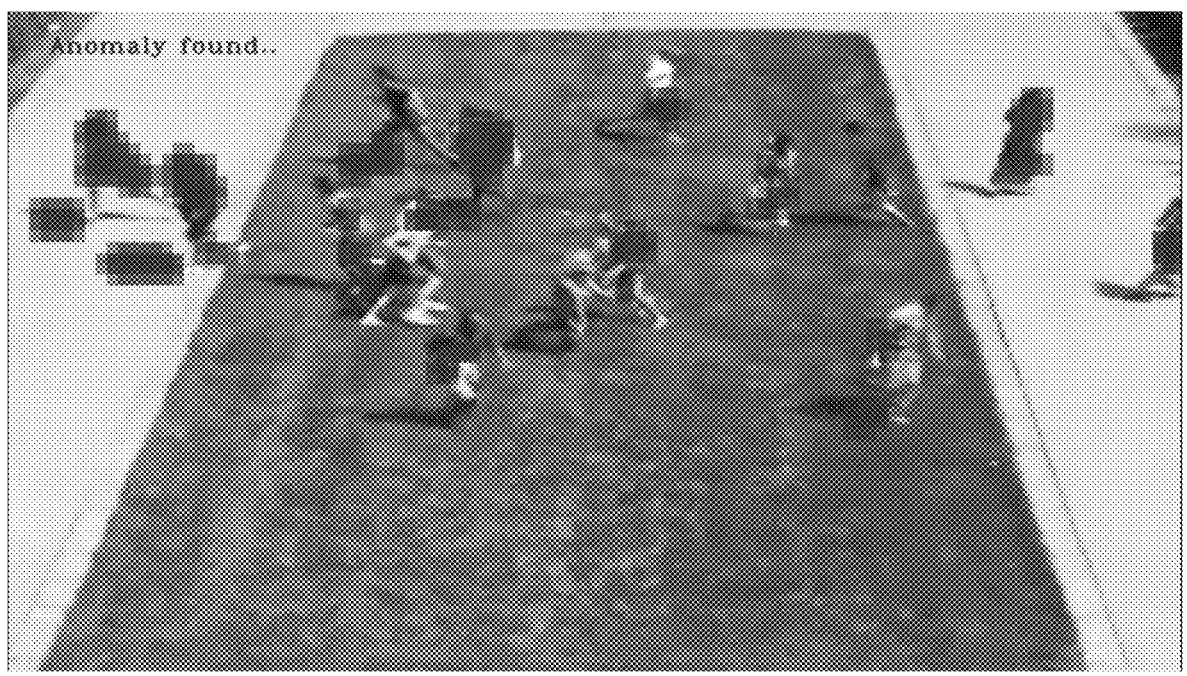
Figure 5E:

Large crowd behaviors and reactions may require a unique approach that differs from action and object detection. FIG. 4 is a diagram illustrating a Disturbance Detection module. This proposed approach is useful when:

- Camera is covering wide field of view or a large gathering of people.
- Identify large changes in crowd flow.
- Detection of objects (such as guns) near impossible in crowded space, but people will run away.
- Detection of fights likely to be obscured or too far away to be noticeable, but the crowd will move away or circle the area.

FIGS. 5A to 5E are diagrams illustrating anomalies found in panic detection crowds. According to these figures, a video scene is analyzed and pixels are overlayed onto the screen indicating rapid motion or detection of panic in a crowd when the appropriate conditions are met. A further notification "Anomaly found . . . " is also displayed.

According to FIGS. 5A to 5E, these diagrams show the output of the model analysis overlaid onto the scene. The clusters of red pixels indicate that these areas have motion from people which is perceived to be faster or in a different direction (erratic) relative to a normal baseline. This baseline is taken from recent history of people's movement within the scene.

If there are a large percentage or number of red pixels in a certain area or quadrant of the frame which also contain one or more people, then the notification "Anomaly found" will display. The "Anomaly found" output indicates that an alert is being generated and sent to the Security Assist UI as seen in FIG. 2.

Figure 6:
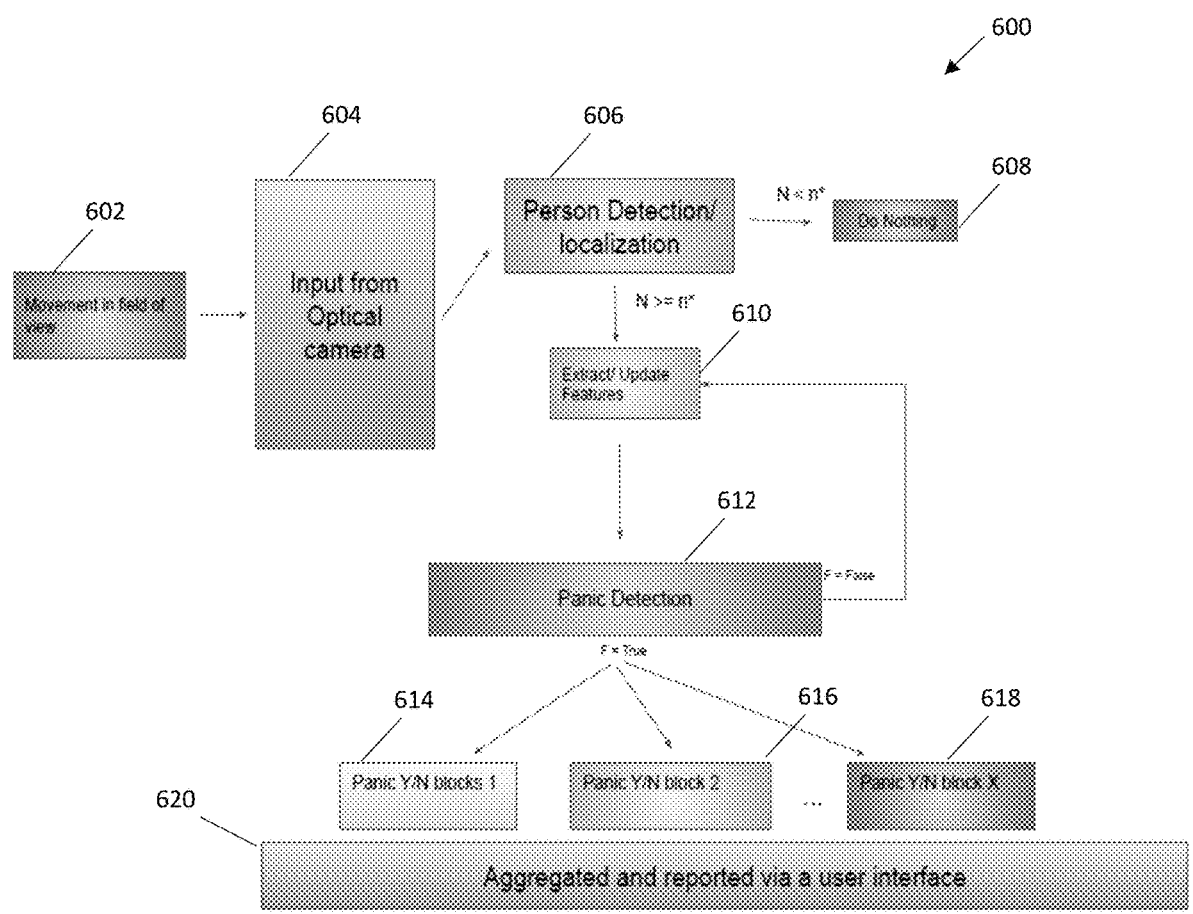
FIG. 6 is a flow chart illustrating a method of panic detection.

FIG. 6 is a flow chart illustrating a method of panic detection. According to FIG. 6 a panic detection system 600 initiates with detecting movement in the field of view of a sensor (e.g., camera) at step 602. Once detected, input is sent to the optical camera, at step 604. Thereafter, panic detection system 600 runs a person detection/localization algorithm at step 606.

The detection/localization algorithm at step 606 calculates whether the number of people in the frame is less than the threshold number of people in the frame (i.e., N<n*). If this is the case, nothing is done. However, if the latter is true (i.e., N>=n*, number of people in the frame is greater than the threshold of the number of people in the frame), the system moves to extract/update features, at step 610.

Thereafter, a panic detection algorithm is processed, at step 612 wherein a function (F) to check for panic detection is executed. If the panic detection function is false (i.e., F=false), then the system returns to step 610 (extract/update features). However, if the panic detection function is true (i.e., T=true), the process moves to the next steps of processing individual panic blocks (i.e., Panic Y/N blocks 1, Panic Y/N block2, Panic Y/N block X) at steps 614, 616 and 618.

According to FIG. 6, the outputs or results are aggregated and reported out via a user interface at step 620. The results can be sent to a mobile device or a security personnel and/or to a command center monitoring for threats using the threat detection system.

Assumptions:

According to this disclosure, software is implemented for panic video detection. Certain assumptions are made, including:

There must be at least three people in the frame for the feature extraction process to start.

There must be at least five people in the frame for the system to detect panic behavior.

Training and Detection:

A training model is built to learn from the normal crowd behavior in the frames. Different sets of rules and thresholds are applied to differentiate between normal and panic crowd behavior. Simple detection criteria include:

Any feature value that appears in a frame and satisfies the rules of normal behavior is considered normal.

Any feature value that is significantly greater than the maximum feature value in the trained model and does not satisfy the rules of normal behavior is considered abnormal.

Feature Extraction:

The frame is divided into a specified number of blocks and features are extracted for every block. In general, we divide the frame into 60×106 blocks with each block having 9 feature channels. One of the low-level features is optical flow. It captures both the speed and the direction of every moving pixel. The calculation of optical flow is modified to achieve improvements in both computation speed and robustness. First, the foreground mask of the previous frame is used to extract good features in the frame which focuses on fewer and only moving pixels. Second, dense optical flow is calculated using OpenCV. Third, the optical flow is filtered to focus only on the locations of good features which makes it more reliable. Filtered optical flow is then projected on a certain number of orientations to obtain the Histogram of Optical Flow feature for each block of a frame.

"Panic" Detection:

If the extracted feature of a frame is greater than the specified threshold and does not fulfill the rules of normal behavior, then that frame is considered abnormal and an alert is generated. A set of different rules was created based on the observation of numerous videos in the test set. The rules are as follows:

A specified number of blocks are considered normal combined with the number of people in a frame if an anomaly is detected in a single or multi quadrant of a frame.

A specified number of overlapping blocks with people in a frame is considered normal if an anomaly is detected on one person or multiple people in a frame.

A specified number of frames are considered normal if anomalous blocks keep overlapping with only one person for multiple consecutive frames.

A frame is considered normal if detected anomalous blocks are not overlapping with any person in a frame.

First, the system checks for overlapping rules, that is if detected blocks overlap with single or multiple persons in the frame. If that rule satisfies then it checks if detected blocks are in single or multi-quadrant combined with a specified person count. All the above-mentioned rules must be satisfied for a frame to be considered normal.

Pseudo Code:

According to this embodiment, an algorithm that may be implemented to execute this routine is as follows:

```
IF FramePersonCount > FeaturePersonCountLimit AND
FrameBeingProcessed < InitialFrameLimit
        THEN
    Update Features
    ELSE IF FramePersonCount > DetectionPersonCountLimit THEN
    IF ProcessedFrame >= InitialFrameLimit THEN
        Call panic detection and get raw output
    IF PersonBlocksOverlap = False THEN
        Update features
    IF NonPersonOverlappingBlocks = True THEN
        Update features for non-person overlapping blocks
    IF PersonBlocksOverlap = True THEN
        Apply overlap rule
        Apply quadrant rule
        Save alert status
        Apply Temporal rule
        IF SinglePersonOverlap = True THEN
            Save alert status and features for current frame
        IF SinglePersonOverlapCount = TemporalRuleFrameCount THEN
            Update features from last four frames
        ELSE
            Generate alert or update features from each saved frame
        IF AlertStatus = False AND FramePersonCount >
        FeaturePersonCountLimit
            Update features
```

The algorithm requires some understanding of the typical people's movement and some initial ingestion of raw frames for analysis of initial features to determine the appropriate rules which would be specific to each camera and scene. These analyses would also help to inform the thresholds appropriate to apply in the algorithm.

The system analyses the recent history of the scene to describe features that would be considered common/normal in the scene when enough people are present.

The system then uses that baseline information to continually analyze frames with the requisite number of people in a frame and update the baseline features. If the features of the scene change dramatically based on the perceived movement of the people in the scene and meet or exceed the threshold features for movement in enough consecutive frames, then the system determines that there is panic in the scene.

In further embodiments of the system, the system will understand what is normal of the scene through video and identify anomalous behaviour and/or erratic events. The system will isolate items in video frames and determine how much different or whether the direction has changed. The system may also be used to identify how many people are in a scene and use algorithms, artificial intelligence and/or machine learning to determine whether the scene is related to panic. For example, a child with a bunch of balloons will not trigger an alarm.

According to embodiments of this disclosure, a threat detection system for mitigating crowd panic detection is disclosed. The threat detection system comprises a camera to capture video images, a computer processor to process the video images, a software module to analyze frames of the video images to detect people's movement, and a notification module to send a notification. The software module of the threat detection system analyzes the recent history of video images with people to identify abnormal movement and creates a baseline and continually analyzes the frames of video images to the baseline and determines whether people's movement in the scene exceeds a threshold to determine a crowd panic scenario.

According to embodiments of this disclosure, the software module identifies people with a cluster of red pixels indicating that these areas have a motion from people which is perceived to be faster or in a different direction relative to a normal baseline, indicating erratic behaviour. The baseline is taken from the recent history of people's movement within the video images representing a scene. Furthermore, the software modules determine If there are a large percentage or number of red pixels in a certain area or quadrant of the frame which also contain one or more people.

According to embodiments of this disclosure, if the features of the scene change dramatically based on the perceived movement of the people in the scene and meet or exceed the threshold features for movement in enough consecutive frames, then the system determines that there is panic in the scene. The scene is analyzed and pixels are overlayed onto the screen indicating rapid motion or detection of panic in a crowd when the appropriate conditions are met. The notification includes displaying a message that an anomaly is found.

According to embodiments of this disclosure, a computer-implemented method for mitigating crowd panic detection using a panic detection system. The method comprises the steps of receiving movement data in the field of view of a camera from an optical camera, executing a person detection or localization algorithm to identify people in a video image frame, extracting features, executing a panic detection algorithm to check for panic detection, comparing the video image frame to identify panic in the frame and reporting the results to the user via a user interface (e.g., a computer display, monitor, mobile device, computer or tablet). The results are then sent to a security personnel and to a command center of a threat detection system.

According to embodiments of this disclosure, the step of identifying people in the video image frame further comprises identifying people with a cluster of red pixels indicating that these areas have motion from people which is perceived to be faster or in a different direction relative to a normal baseline, indicating erratic behaviour. The baseline is taken from the recent history of people's movement within the video images representing a scene.

According to embodiments of this disclosure, the step of identifying people in the video image frame further comprises determining If there are a large percentage or number of red pixels in a certain area or quadrant of the frame which also contain one or more people. Furthermore, if the features of the scene change dramatically based on the perceived movement of the people in the scene and meet or exceed the threshold features for movement in enough consecutive frames, then determine that there is panic in the scene.

According to embodiments of this disclosure, the scene is analyzed and pixels are overlayed onto the screen indicating rapid motion or detection of panic in a crowd when the appropriate conditions are met. Furthermore, the step of reporting the results further comprises displaying a message that an anomaly is found.

Implementations disclosed herein provide systems, methods and apparatus for generating or augmenting training data sets for machine learning training. The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for the proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory), and the like. Also, "determining" can include resolving, selecting, choosing, establishing, and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed is:

1. A threat detection system for mitigating crowd panic detection, comprising:
 a camera to capture video images;
 a computer processor to process the video images;
 a software module to analyze frames of the video images to detect people's movement; and
 a notification module to send a notification;
 wherein the software module determines whether number of people in the frame of the video image exceeds a threshold number to proceed with further extraction of the frame image;
 wherein the software module analyzes recent history of video images with people to identify abnormal movement;
 wherein the software module creates a baseline and continually analyzes the frames of video images to the baseline and determines whether people's movement in the scene exceeds a threshold to determine a crowd panic scenario;
 wherein the software module identifies people with cluster of red pixels indicating that these areas have motion from people which is perceived to be moving faster or in a different direction relative to a baseline, indicating erratic behaviour;
 wherein the baseline is taken from recent history of people's movement within the video images representing a scene;
 wherein if the features of the scene changes dramatically based on the perceived movement of the people in the scene and meet or exceed the threshold features for movement in enough consecutive frames, the system determines that there is panic in the scene;
 wherein once a panic in the scene is assessed, the processor is further configured to execute one or more overlapping rule and quadrant rule to determine a scene from "abnormal" to "normal".

2. The system of claim 1 wherein the software modules determines If there are a large percentage or number of red pixels in a certain area or quadrant of the frame which also contain one or more people.

3. The system of claim 1 wherein the scene is analyzed and pixels are overlayed onto the screen indicating rapid motion or detection of panic in a crowd when the appropriate conditions are met.

4. The system of claim 1 wherein the notification includes displaying a message that an anomaly is found.

5. The system of claim 1 wherein the notification is sent to a user interface.

6. The system of claim 5 where the user interface is selected from a list consisting of a computer display, monitor, mobile device, computer or tablet.

7. The system of claim 1 wherein the threshold of number of people in a frame for the feature extraction process to start is three people.

8. The system of claim 1 where in the overlapping rule and quadrant rule is selected from a list consisting of:
 specifying a number of blocks are considered normal combined with the number of people in a frame if an anomaly is detected in a single or multi quadrant of a frame;
 specifying a number of overlapping blocks with people in a frame is considered normal if an anomaly is detected on one person or multiple people in a frame;
 specifying a number of frames are considered normal if anomalous blocks keep overlapping with only one person for multiple consecutive frames; and
 determining a frame to be normal if detected anomalous blocks are not overlapping with any person in a frame.

9. The method of claim 1 wherein the overlapping rule and quadrant rule is selected from a list consisting of:
 specifying a number of blocks are considered normal combined with the number of people in a frame if an anomaly is detected in a single or multi quadrant of a frame;
 specifying a number of overlapping blocks with people in a frame is considered normal if an anomaly is detected on one person or multiple people in a frame;
 specifying a number of frames are considered normal if anomalous blocks keep overlapping with only one person for multiple consecutive frames; and
 determining a frame to be normal if detected anomalous blocks are not overlapping with any person in a frame.

10. A computer-implemented method for mitigating crowd panic detection using a panic detection system, the method comprising the steps of:

receiving movement data in field of view of a camera;

executing a person detection or localization algorithm to identify people in a video image frame;

extracting features;

executing a panic detection algorithm to check for panic detection;

comparing the video image frame to identify panic in the frame; and reporting the results to the user via a user interface;

wherein the software module determines whether number of people in the frame of the video image exceeds a threshold number to proceed with further extraction of the frame image;

wherein the software module identifies people with cluster of red pixels indicating that these areas have motion from people which is perceived to be moving faster or in a different direction relative to baseline, indicating erratic behaviour;

wherein the baseline is taken from recent history of people's movement within the video images representing a scene;

wherein if the features of the scene change dramatically based on the perceived movement of the people in the scene and meet or exceed the threshold features for movement in enough consecutive frames, the system determines that there is panic in the scene;

wherein once a panic in the scene is assessed, the processor is further configured to execute one or more overlapping rule and quadrant rule to determine a scene from "abnormal" to "normal".

11. The method of claim 10 wherein the step of receiving movement further comprising receiving input from an optical camera.

12. The method of claim 10 wherein the user interface is selected from a list consisting of a computer display, monitor, mobile device, computer or tablet.

13. The method of claim 10 wherein the results are sent to a security personnel and to a command center of a threat detection system.

14. The method of claim 10 wherein the step of identifying people in the video image frame further comprises determining If there are a large percentage or number of red pixels in a certain area or quadrant of the frame which also contain one or more people.

15. The method of claim 10 wherein the scene is analyzed and pixels are overlayed onto the screen indicating rapid motion or detection of panic in a crowd when the appropriate conditions are met.

16. The method of 10 wherein the step of reporting the results further comprising displaying a message that an anomaly is found.

17. The method of claim 10 wherein the threshold of number of people in a frame for the feature extraction process to start is three people.

* * * * *